United States Patent
Graf

(10) Patent No.: US 9,683,879 B2
(45) Date of Patent: Jun. 20, 2017

(54) MAGNETO INDUCTIVE FLOWMETER HAVING A CABLE GUIDING MOUNTING CLIP PROVIDED ON THE POLE SHOE

(71) Applicant: Endress+Hauser Flowtec AG, Reinach (CH)

(72) Inventor: Oliver Graf, Kanerkinden (CH)

(73) Assignee: Endress + Hauser Flowtec AG, Reinach (CH)

( * ) Notice: Subject to any disclaimer, the term of this patent is extended or adjusted under 35 U.S.C. 154(b) by 71 days.

(21) Appl. No.: 14/443,843

(22) PCT Filed: Oct. 29, 2013

(86) PCT No.: PCT/EP2013/072562
§ 371 (c)(1),
(2) Date: May 19, 2015

(87) PCT Pub. No.: WO2014/079660
PCT Pub. Date: May 3, 2014

(65) Prior Publication Data
US 2015/0316399 A1    Nov. 5, 2015

(30) Foreign Application Priority Data
Nov. 22, 2012  (DE) .................... 20 2012 104 525 U

(51) Int. Cl.
*G01F 1/58*          (2006.01)
(52) U.S. Cl.
CPC .............. *G01F 1/586* (2013.01); *G01F 1/588* (2013.01)

(58) Field of Classification Search
None
See application file for complete search history.

(56) References Cited

U.S. PATENT DOCUMENTS

| 4,729,534 A | 3/1988 | Hill et al. |
| 4,899,593 A | 2/1990 | Inami et al. |
| 5,337,607 A | 8/1994 | Brown |

(Continued)

FOREIGN PATENT DOCUMENTS

| DE | 1861075 U | 10/1962 |
| DE | 1162587 B | 2/1964 |

(Continued)

OTHER PUBLICATIONS

English Translation of International Preliminary Report on Patentability, WIPO, Geneva, Jun. 4, 2015.

(Continued)

*Primary Examiner* — Harshad R Patel
(74) *Attorney, Agent, or Firm* — Bacon & Thomas, PLLC

(57) ABSTRACT

A pole shoe, especially for use with a system for magneto inductive flow measurement. The pole shoe is provided with at least one cable guiding system for guiding a cable through the pole shoe. A mounting clip for guiding cable in a pole shoe wherein the mounting clip includes at least one guiding opening for guiding at least one cable and at least one securement region for securing the mounting clip to the pole shoe. A magneto inductive flow measuring system, comprising at least two pole shoes and at least one coil core, wherein at least one of the pole shoes is provided with at least one cable guiding system for guiding a cable through the pole shoe.

15 Claims, 3 Drawing Sheets

(56) References Cited

U.S. PATENT DOCUMENTS

| | | | |
|---|---|---|---|
| 9,068,868 B2 | 6/2015 | Voigt et al. | |
| 2011/0275232 A1* | 11/2011 | Duesterhoeft | H02S 40/34 |
| | | | 439/276 |
| 2012/0297891 A1* | 11/2012 | Voigt | G01F 1/586 |
| | | | 73/861.11 |

FOREIGN PATENT DOCUMENTS

| | | |
|---|---|---|
| DE | 3708102 A1 | 4/1988 |
| DE | 3709963 C1 | 5/1988 |
| DE | 3908698 A1 | 9/1989 |
| DE | 102005052832 A1 | 5/2007 |
| DE | 102010001393 A1 | 8/2011 |
| EP | 0283575 A2 | 9/1988 |
| FR | 1290461 A | 4/1962 |
| GB | 917409 A | 2/1963 |
| GB | 2170010 A | 7/1986 |

OTHER PUBLICATIONS

International Search Report EPO, The Netherlands, Mar. 24, 2014.
German Search Report, German PTO, Munich, Aug. 2, 2013.

* cited by examiner

MAGNETO INDUCTIVE FLOWMETER HAVING A CABLE GUIDING MOUNTING CLIP PROVIDED ON THE POLE SHOE

TECHNICAL FIELD

The invention relates to a pole shoe, especially for use in a system for magneto inductive flow measurement, to a mounting clip, as well as to a magneto inductive flow measuring system comprising at least two pole shoes and at least one coil core.

BACKGROUND DISCUSSION

Magneto inductive flow measuring systems with pole shoes are known in the state of the art. These provide volumetric flow measurement in a measuring tube using electrodynamic induction. Present are measuring electrodes, which ascertain a measurement voltage. This is induced by producing a magnetic field directed perpendicularly to entrained, charge carriers of a medium flowing through the measuring tube and arranging the measuring electrodes essentially perpendicularly to the flow direction of the medium and perpendicularly to the direction of the magnetic field. The measurement voltage induced in the measuring electrodes is proportional to the flow velocity of the medium averaged over the cross section of the measuring tube and, thus, proportional to the volume flow rate. In the case of known density of the medium, the mass flow of the medium in the measuring tube can also be determined. For tapping the measurement voltage, most often two measuring electrodes are provided, thus a measuring electrode pair. The pair of electrodes is located bracketing the measuring tube axis where magnetic field strength is maximum, thus in the region of the expected maximum measurement voltage.

For example, published international application, WO 2008/028872 A1 discloses a magneto inductive flow measuring device for measuring volume flow or mass flow of a medium in a pipeline and comprises a measuring tube, through which the medium flows in the direction of the measuring tube axis, a magnet system, which produces a magnetic field passing through the measuring tube and extending essentially transversely to the measuring tube axis, coupled with the medium at least one measuring electrode, which is arranged in a region of the measuring tube lying essentially perpendicular to the magnetic field, and a control/evaluation unit, which, based on the measurement voltage induced in the at least one measuring electrode, delivers information concerning the volume flow or mass flow of the medium in the measuring tube.

Known from published international application, WO 2011/091899 A1 is another magneto inductive flow measuring device. In this case, a first coil component with a coil body for accommodating a pole core of a coil is provided, wherein the coil on the coil body and the coil core are arranged in a first opening of the coil body with a longitudinal axis of the coil core being coaxial to the coil. The coil core includes a molding and the coil body a stop, which is arranged between measuring tube and coil. The coil core is formed as a pole shoe. Arranged between coil core and measuring tube is at least one pole sheet, wherein each pole sheet is separately snapped in the mounted state of the same into a depression provided in the coil body. The coil body includes at least one cable guide for guiding a cable, so that the guided cable of a predetermined length does not exceed a certain separation from the coil body.

During the positioning of a cable, especially a coaxial cable, in a magneto inductive flow measuring system in the region of the pole shoe and/or coil core, there is the danger that the cable becomes pinched or damaged by metal edges located there. Damage to the cable to the coil core can lead to short circuiting, especially in the presence of vibrations during operation the magneto inductive flow measuring system.

SUMMARY OF THE INVENTION

An object of the present invention is, consequently, a pole shoe as well as a magneto inductive flow measuring system comprising at least two pole shoes and at least one coil core, wherein danger of damage to a cable, especially in the region of pole shoe and/or coil core, is avoided as much as possible.

The object is achieved for a pole shoe including that the pole shoe is provided with at least one cable guiding system for guiding a cable through the pole shoe. The object is achieved, furthermore, by a mounting clip for cable guiding in a pole shoe and having at least one guiding opening for guiding at least one cable and at least one securement region for securing the mounting clip to the pole shoe. For a magneto inductive flow measuring system, the object is achieved by features including that at least one of the pole shoes is provided with at least one cable guiding system for guiding a cable through the pole shoe. Further developments of the invention are defined in the dependent claims.

In this way, a pole shoe is created, which, due to the providing of the cable guiding system, enables a guided passage of the one or more cables through the pole shoe. The one or more cables, thus, no longer have to be guided with the pole shoe, but, instead, can pass through it. This leads, on the one hand, to the feature that the danger of pinching is removed, while, on the other hand, damaging of the cable on sharp metal edges of the pole shoe or the coil core is prevented. Advantageously, the cable guiding system is a mounting clip insertable or inserted in the pole shoe. This can serve for guiding and protecting the cable in the region of the pole shoe and coil core, since the at least one cable is led protectively through it. Also, in the case of vibrations during use of the magneto inductive flow measuring system, short circuiting of the cable to the coil core is no longer experienced, since the cable is guided in the mounting clip within the pole shoe and is safely protected against damage. The reject rate due to cable damage can likewise be lessened even in the case of assembling not yet functioning, magneto inductive flow measuring systems, since also in the case of assembly, there is no longer the danger of damaging the cable on sharp metal edges of pole shoe and/or coil core. By purposeful guiding of the cable through the pole shoe within the cable guiding system in the form of the mounting clip, an exact positioning and retention of the at least one cable is possible during assembly. Since the mounting clip only needs to be inserted into the pole shoe and the at least one cable inserted into the mounting clip, also assembly time can be lessened compared with the previous procedure while at the same time a reproducibly exact positioning of the cable is achieved. The cable is located always exactly in the desired position, led in the pole shoe within the magneto inductive flow measuring system.

The mounting clip has advantageously an elongated, central body, with which it can be inserted into an elongated receiving opening in the pole shoe. The mounting clip then sits in this elongated receiving opening, so that the cable can be led through the mounting clip and in such. With its at least one securement region, the mounting clip is secured to the pole shoe in the elongated receiving opening. A simple securement of the mounting clip to the pole shoe is especially possible by the feature that the securement region of the mounting clip is at least partially grooved. The section of the pole shoe equipped with the elongated receiving opening can be accepted into this groove shaped section of the securement region. The pole shoe can be embodied sheet-like, thus essentially with flat sections, wherein the edges, which demarcate the elongated receiving opening, engage in the grooves, respectively the groove shaped section, of the securement region of the mounting clip. The forming of the pole shoe can, furthermore, provide a middle section and two adjoining, oppositely angled, oppositely lying sections, wherein the cable guiding system is arranged in the form of the mounting clip in the middle section.

The mounting clip with its securement region can be pushed into the elongated receiving opening, especially from a neighboring opening, which communicates with or transitions into the elongated receiving opening. The guiding opening is advantageously arranged on an end of the mounting clip and bounded by walls in only two directions. An open side is advantageously formed terminally on the mounting clip, open in the direction of the pole shoe opening neighboring the elongated receiving opening, so that the assembling of the cable can, in given cases, occur yet easier from the opening neighboring the elongated receiving opening.

The mounting clip can have at least one cable guiding channel. This extends advantageously oppositely to the terminally open side of the guiding opening. The side walls bounding the guiding opening on two sides extend in the longitudinal direction of the mounting clip farther than the side walls of the cable guiding channel. The cable guiding channel is advantageously ramp shaped and slopes from the guiding opening toward the end of the mounting clip lying opposite the guiding opening, where the cable is to be led out of the mounting clip. The cable led through the guiding opening of the mounting clip is, thus, not led on the shortest path back out of the mounting clip, but, instead, led into the cable guiding channel in the mounting clip. Thus, the cable can be led near to the pole shoe. In such case, it is also possible to guide the cable from the mounting clip at the location, where the least danger of damage to the cable is present, thus especially the least danger of kinking the cable. For additional anti-kink protection of the cable inserted, respectively insertable, into the mounting clip, the transitional region from the guiding opening into the cable guiding channel can rounded, respectively provided with a radius. For additional protection of the cable in the interior of the mounting clip, the ramp shaped cable guiding channel has a moderate slope. The slope of the ramp of the cable guiding channel, thus the angle of the floor of the cable guiding channel relative especially to the plane of the outer surface of the mounting clip can be, for example, 10° to 20°, especially 14.5°. Also, other slopes of the ramp shaped cable guiding channel are possible.

In order to construct the at least partially groove shaped securement region on the mounting clip, the mounting clip can have flanges. These can be provided on the upper and lower sides of the mounting clip, wherein the flanges after insertion of the mounting clip into the elongated receiving opening can lie on the upper- and undersides of the sheet like pole shoe bounding the elongated receiving opening, and, thus, accommodate the pole shoe sheet metal between them. This also stabilizes the region of the pole shoe sheet metal surrounding the elongated receiving opening. By providing the cable guiding system in the form of the mounting clip, thus, also in the case of comparatively smaller thickness of the pole shoe sheet metal, a stable protection for the cable led therethrough can be present.

Advantageously, the pole shoe is embodied essentially uniformly flat, wherein the mounting clip can basically also be matched to the shape of the pole shoe in the region extending from its receiving opening.

Additionally advantageously provided in the guiding opening of the mounting clip is at least one projecting element for supporting the guiding of an inserted cable. The projecting element can especially be knob shaped. For example, knob shaped elements can be provided on the two mutually opposing walls of the guiding opening of the mounting clip. The projecting elements, especially knob shaped elements, enable an insertion of the cable from the open side of the guiding opening, which is U shaped in plan view, while making difficult, after insertion of the cable, in the case of corresponding dimensioning of the projecting elements with reference to the cable diameter and the opening diameter of the guiding opening, an unintended escape of the cable from the grip provided by the projecting elements.

Also, the mounting clip can externally be provided with at least one projecting element, in order to improve the hold in the elongated receiving opening of the pole shoe. This can prove to be especially advantageous in the case of manufacturing tolerances relative to the elongated receiving opening in the pole shoe, since via the projecting, especially knob shaped, elements an equalization the manufacturing tolerances and, thus, a good hold of the mounting clip in the elongated receiving opening of the pole shoe can be created.

Further advantageous is to so construct the cable guiding system in the form a mounting clip that this is usable for positioning the coil core. By providing the mounting clip for cable guiding through the pole shoe, there is, in such case, supplementally the opportunity to use this also for positioning a coil core. Especially, the coil core can be provided with corresponding cavities, in which the at least one mounting clip can engage. In this way, the coil core can be exactly positioned with reference to the pole shoe, which is provided with the mounting clip.

In the assembly of the magneto inductive flow measuring system, coil, pole shoe with cable guiding system, respectively the mounting clip, and at least one cable guided therethrough and coil core, as well as other as possible systems, can be preassembled to a unit and mounted on a measuring tube. Then, the at least one cable is grasped and pulled back in the mounting clip in the pole shoe and thereby tensioned. In such case, there is no longer danger of damage to the cable, since such is accommodated and guided safely in the cable guiding system. A complicated laying of the cable is no longer required.

BRIEF DESCRIPTION OF THE DRAWINGS

The invention will now be described in greater detail based on an example of an embodiment presented in the drawing, the figures of which show as follows.

DETAILED DISCUSSION IN CONJUNCTION WITH THE DRAWINGS

Figure 1:
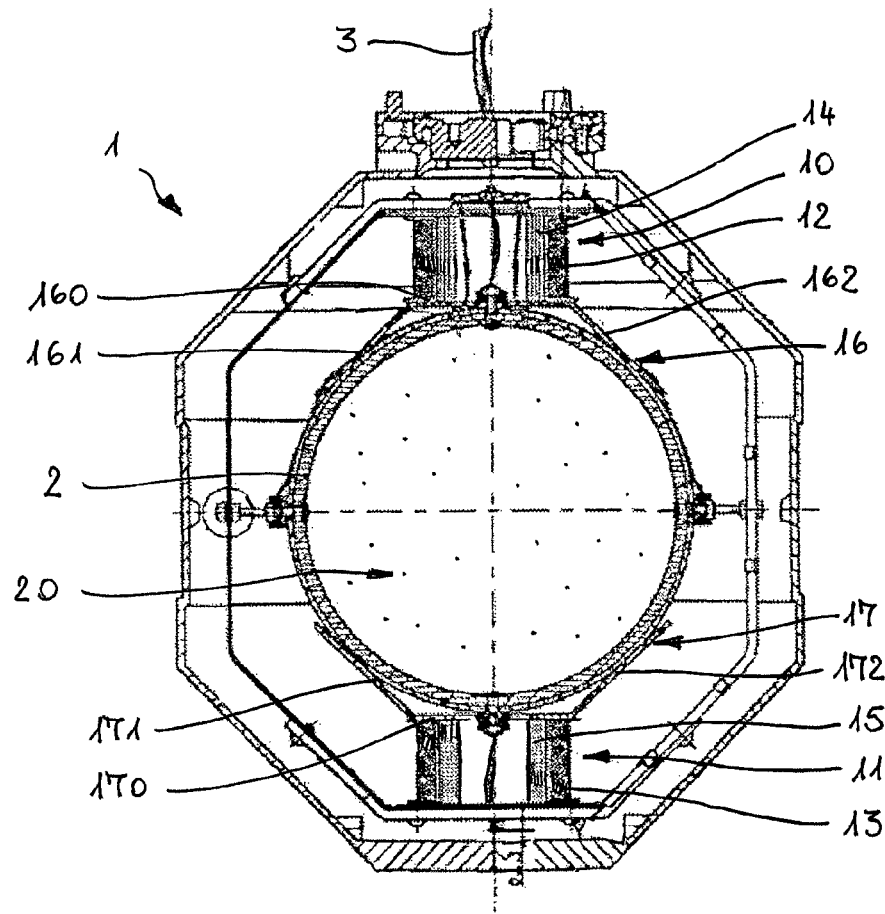
FIG. 1 is a sectional view of a magneto inductive flow measuring system with two pole shoes of the invention.

Shown in FIG. 1 is a magneto inductive flow measuring system 1 mounted on a measuring tube 2. The magneto inductive flow measuring system 1 serves for ascertaining magnitude of flow of medium through the measuring tube 2. To this end, the magneto inductive flow measuring system 1 produces a magnetic field perpendicular to the movement of charge carriers of the medium 20 flowing in FIG. 1 within the measuring tube 2. The flow is either into the plane of the drawing, away from the observer, or out of the plane of the drawing, toward the observer. In FIG. 1 the flow direction is out of the plane of the drawing, toward the observer. The arrows of the flow direction are indicated by the dots.

The magnetic field is produced by two coil components 10, 11 oppositely arranged relative to one another on the measuring tube 2 and each having a coil body 12, 13 on a coil core 14, 15, provided, in each case, with a pole shoe 16, 17. The pole shoes 16, 17 serve for field guidance and are correspondingly so formed that they lie externally on the measuring tube 2. For this purpose, the pole shoes each have a middle section 160, 170, to which connect two oppositely lying, angled, lateral sections 161, 162, respectively 171, 172. This is better seen in FIG. 2. The three sections 160, 161, 162, respectively 170, 171, 172, contact the measuring tube 2 externally, in each case, tangentially. Arranged perpendicularly to the flow direction of the medium 20 and to the direction of the produced magnetic field are measuring electrodes, in which a measurement voltage is induced.

Connected with the measuring electrodes is a coaxial cable 3, such as indicated in FIG. 1. In order to prevent that the coaxial cable is damaged in being led past the pole shoe 16, respectively 17, respectively the coil core 14, respectively 15, the two pole shoes 16, 17, each have a cable guiding system in the form of a mounting clip 4, wherein coaxial cable can be led through the cable guiding system and the respective pole shoes.

Figure 2:
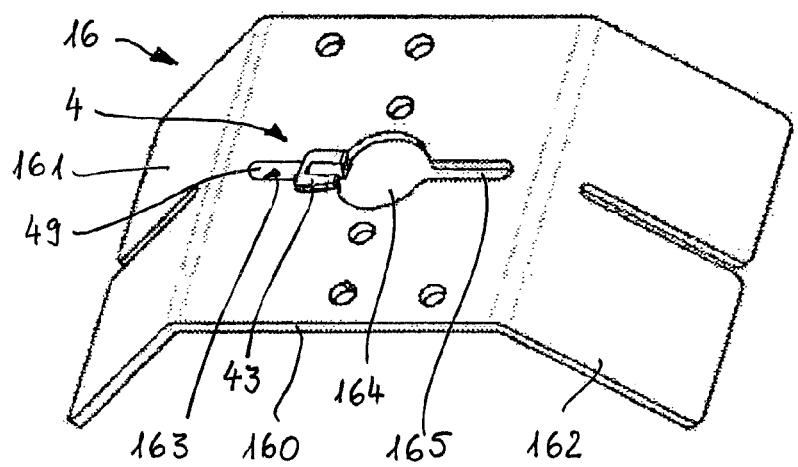
FIG. 2 is a perspective view of one of the pole shoes of FIG. 1 with inserted mounting clip of the invention.

Shown in perspective view in FIG. 2 is pole shoe 16 with a mounting clip 4 inserted into its elongated opening 163. The insertion of the mounting clip 4 occurs from a neighboring, for instance, circularly shaped, central passageway opening 164. This is likewise to be seen in FIG. 2. The central passageway opening 164 communicates with two elongated openings, the already mentioned elongated opening 163 as well as an oppositely lying elongated opening 165 on the other side of the central passageway opening 164. Also, a mounting clip 4 can be inserted into the elongated opening 165. Fundamentally, it is especially likewise possible to insert a mounting clip 4 for guiding the cable 3 both into the elongated opening 163 as well as also into the elongated opening 165.

Mounting clip 4 is shown in detail in FIGS. 3 to 8. Mounting clip 4 has an elongated form with a straight, open end 140 and a rounded, closed end 47. Provided at the open end 140 is a guiding opening 40 for guiding the cable 3. Adjoining the section 141 having the guiding opening 40 is a central, elongated section 49 closed on three sides. For securing to the pole shoe 16, the section 141 encompassing the guiding opening 40 has a peripheral securement region 41. This includes a groove shaped section 42. Grooved section 42 is formed, such as evident from the bottom view of the mounting clip 4 in FIG. 4, the top view in FIG. 5 as a well the front view of FIG. 6, by providing projecting flanges 43, 44 on the oppositely lying, external sides 143, 144 of the mounting clip 4 in the region of the groove shaped section 42. As evident from the perspective view of the mounting clip 4 in FIG. 3, side walls 45, 46 of the guiding opening 40 extend between the two projecting flanges 43, 44. As evident from the front view of FIG. 6, the external groove shape of the groove shaped section 42 results from the two flanges 43, 44 and the side walls 45, 46 arranged therebetween.

Figure 4:
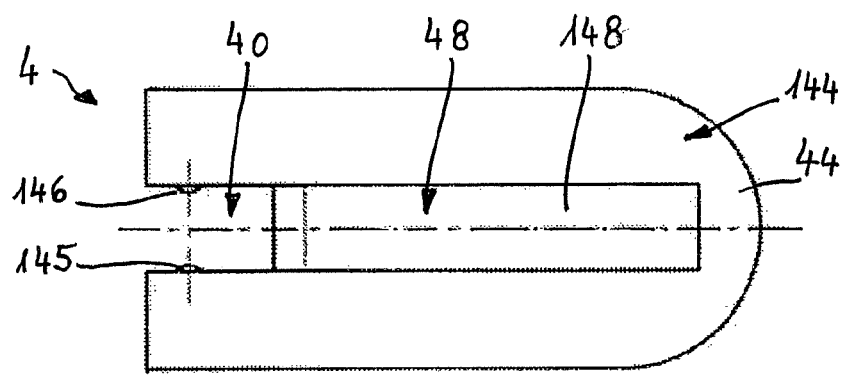
FIG. 4 is a bottom view of the mounting clip of FIG. 2.
Figure 5:
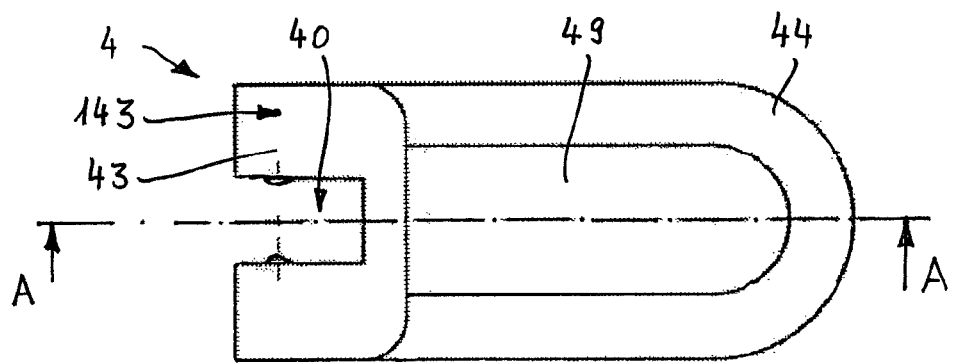
FIG. 5 is a top view of the mounting clip of FIG. 2.

As evident from comparison of FIGS. 4 and 5, thus the top view and the bottom view of the mounting clip 4, the projecting flange 44 extends externally over the total periphery of the mounting clip 4, while the projecting flange extends only around the guiding opening 40. Grooved section 42 is, thus, only arranged in the region, which surrounds the guiding opening 40. Fundamentally, it is, however, likewise possible also to provide the projecting flange 43 over the entire extent of the mounting clip 4, thus on all sides peripherally around such, thus also around the total central section 49. The providing of the projecting flange 43 only around the guiding opening 40 is, however, sufficient for a safe retention of the mounting clip 4 on the pole shoe 16. The central section 49 lies in the elongated opening 163, such as indicated in FIG. 2. Since only the shorter projecting flange 43 is provided, the coil core 14 can be connected without problem with the pole shoe 16. Especially, the projecting flange 43 of the mounting clip 4 can be used for positioning the coil core 14. The coil core 14 can especially be provided with a groove or cavity, into which the projecting flange 43 can engage, in order to be able to provide an exact positioning.

Figure 8:
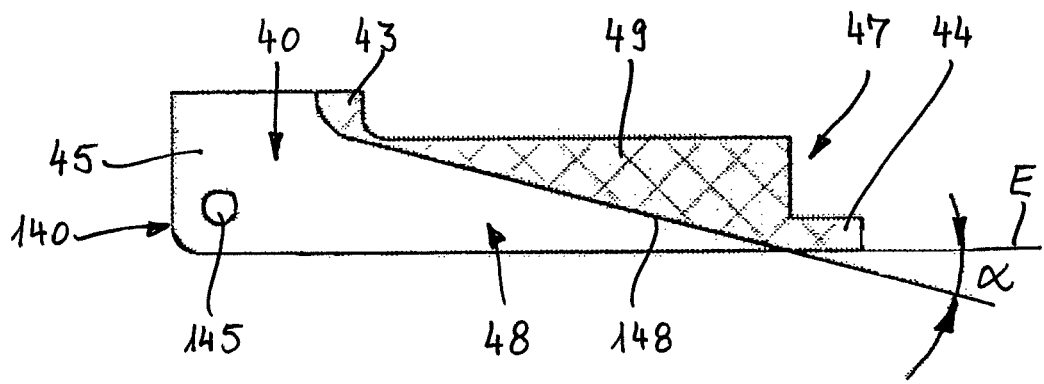
FIG. 8 is a longitudinal sectional view of the mounting clip of FIG. 5 taken with the cutting plane A-A of FIG. 5.

As shown in the sectional view of the mounting clip 4 in FIG. 8 taken along the cutting plane A-A of FIG. 5, the guiding opening 40 is not provided with a side wall toward the oppositely lying end 47 of the mounting clip, but, instead, communicates with a ramp shaped, cable guiding channel 48. The ramp shaped cable guiding channel 48 includes a floor 148 arranged angled relative to the outer surface of the mounting clip 4, thus the plane E, in which the outside 144 of the projecting flange 44 extends. The side walls of the cable guiding channel 48 are the side walls 45, 46. The angle α of the floor 148 of the cable guiding channel 48 measured from the plane E of the outside 144 of the projecting flange 44 is advantageously an acute angle and can especially lie between 10° to 20°, for example, 14.5°. Also other angles of slope are possible here, wherein by providing the sloped floor 148, starting from the guiding opening 40 and progressing to the outside 144 of the projecting flange 44, the cable can be brought to follow closely the surface of the pole shoe. Damage to or pinching of the cable can also thereby be very well prevented in the case of vibrations arising in use of the magneto inductive flow measuring system 1.

As furthermore evident from the sectional view of the mounting clip 4 of FIG. 8, the central section 49 of the mounting clip 4 surrounding the cable guiding channel 48 is embodied as a solid body in the region, in which the cable guiding channel 48 rises toward the projecting flange 44. This central section 49 extends in the elongated opening 163, respectively 165, of the pole shoe 16, respectively a corresponding elongated opening of the pole shoe 17 (not shown), and, consequently, is sufficiently stably embodied to enable very good guiding for the cable guided therethrough, respectively for cable lying in the cable guiding channel 48 and the guiding opening 40, and to remain stable both in the case of mechanical as well as also in the case of thermal loadings. To this end, the mounting clip 4 can be made, for example, of a temperature-resistant polymer, especially a fiber reinforced polymer.

In order to better prevent undesired escape of cable 3 inserted into the guiding opening 40 from the guiding opening 40 into the large passageway opening 164, the two side walls 45, 46 are provided with projecting knob shaped elements 145, 146. Depending on dimensions of the cable, respectively the opening dimension d of the guiding opening 40, cable 3 inserted between these projecting knob shaped elements 145, 146 of the guiding opening 40, respectively the mounting clip 4, becomes held against escape. For example, it is sufficient in the case of an opening dimension d of 2 to 3 mm, when the knob shaped elements 145, 146 project less than 0.3 mm from the surfaces of the side walls 45, 46.

Figure 3:
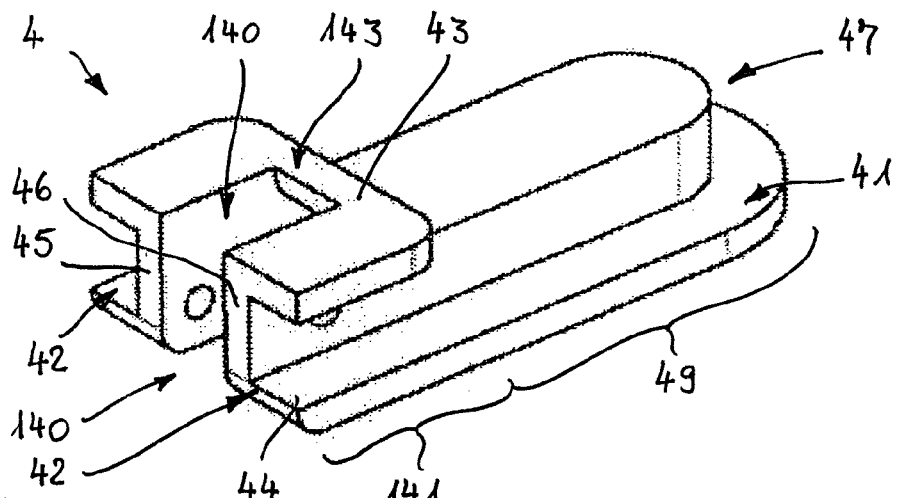
FIG. 3 is a perspective view of the mounting clip of FIG. 2 from above.
Figure 6:
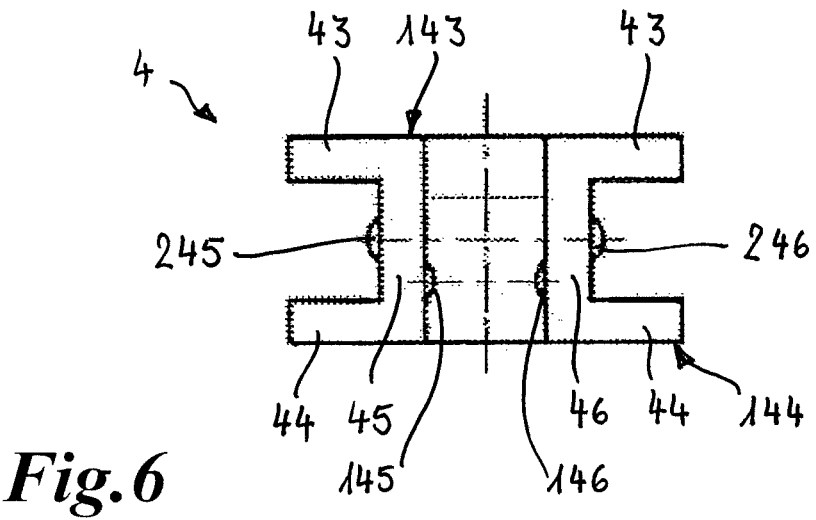
FIG. 6 is a front view of the mounting clip of FIG. 2.
Figure 7:
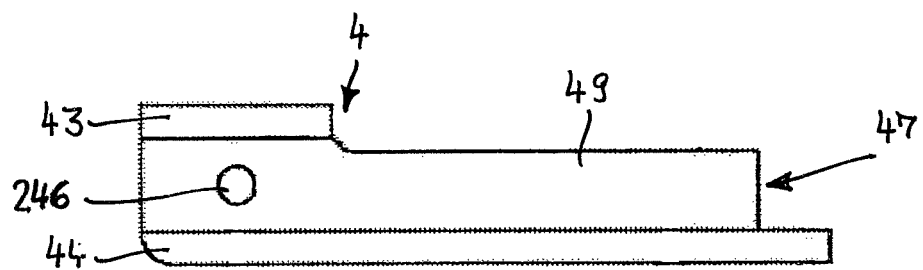
FIG. 7 is a side view of the mounting clip of FIG. 2.

Also on the outside of the two side walls 45, 46, projecting elements 245, 246 can be provided, such as indicated in FIGS. 3, 6 and 7. The two projecting elements 245, 246 can serve, on the one hand, for compensating for manufacturing tolerances relative to the elongated openings 163, respectively 165, and, on the other hand, for the better affixing of the mounting clip 4 therein. The projecting elements 245, 246 can project, for example, less than a millimeter from the surface of the side walls 45, 46, wherein also other dimensions are, of course, possible.

As mentioned, the hold at the respective coil core 14, 15 can be improved by providing the mounting clip 4 for cable guiding in the pole shoes and protecting the cable 3 against damage from the pole shoe, since the cable then is led through the pole shoe and no longer past it. The cable 3 is located after the threading into the mounting clip 4, respectively its guiding opening 40 and cable guiding channel 48, in the desired exact position. The mounting of the cable at the pole shoe is, consequently, simple and uncomplicated. For example, coil body 12, 13, coil core 14, 15 and pole shoe 16, 17 are pre-assembled with mounting clip 4 and coaxial cable 3 as one unit. This unit is then mounted on the measuring tube 2 and the cable 3 pulled back and tensioned, in order to obtain the desired optimal positioning in the guiding opening 40 and the cable guiding channel 48. Other measures are no longer required, so that simple mounting and short assembly times are obtained.

Besides the variants of pole shoes, mounting clips and magneto inductive flow measuring systems above described and shown in the figures, as well as any combination of the mentioned features, still numerous other variants can be provided, in the case of which the pole shoe is provided with at least one cable guiding system, especially in the form of a mounting clip, for guiding a cable through the pole shoe.

The invention claimed is:

1. A magneto inductive flow measuring system, comprising:
    at least two pole shoes; and
    at least one coil core, wherein:
    at least one of said pole shoes is provided with at least one cable guiding system for guiding a cable through said at least one of said pole shoes, and
    said cable guiding system is a mounting clip insertable or inserted in the pole shoe.

2. The magneto inductive flow measuring system as claimed in claim 1, wherein:
    said mounting clip is insertable or inserted into an elongated receiving opening in said pole shoe.

3. The magneto inductive flow measuring system as claimed in claim 1, wherein:
    said pole shoe has a middle section and two adjoining, oppositely angled, oppositely lying sections; and
    said cable guiding system is arranged in said middle section.

4. The magneto inductive flow measuring system as claimed in claim 1, wherein:
    said cable guiding system is so embodied in the form of a mounting clip that such can be used for positioning the coil core.

5. The magneto inductive flow measuring system as claimed in claim 1, wherein:
    said mounting clip has at least one guiding opening for guiding at least one cable; and
    at least one securement region for securing the mounting clip to the pole shoe.

6. The magneto inductive flow measuring system as claimed in claim 5, wherein:
    said guiding opening is arranged at one end of said mounting clip and bounded by walls in only two directions.

7. The magneto inductive flow measuring system as claimed in claim 5, wherein:
    the mounting clip has at least one cable guiding channel.

8. The magneto inductive flow measuring system as claimed in claim 7, wherein:
    said cable guiding channel is ramp shaped and slopes from said guiding opening in the direction of an oppositely lying end of the mounting clip.

9. The magneto inductive flow measuring system as claimed in claim 7, for protection against kinking of an inserted or insertable cable, the transitional region from said guiding opening into said cable guiding channel is rounded.

10. The magneto inductive flow measuring system as claimed in claim 5, wherein:
    said securement region is at least partially grooved.

11. The magneto inductive flow measuring system as claimed in claim 10, wherein:
    for forming said at least partially grooved securement region, flanges are formed on the upper and lower sides of the mounting clip.

12. The magneto inductive flow measuring system as claimed in claim 5, wherein:
    at least one projecting element is provided in said guiding opening for guiding of an inserted cable.

13. The magneto inductive flow measuring system as claimed in claim 12, wherein:
    said projecting element is knob shaped.

14. The magneto inductive flow measuring system as claimed in claim 5, wherein:
    for improving retention in an elongated receiving opening of the pole shoe the mounting clip is provided externally with at least one projecting element.

15. The magneto inductive flow measuring system as claimed in claim 5, wherein:
    said mounting clip has at least one cable guiding channel lying opposite to an open side of said guiding opening located terminally on the mounting clip.

* * * * *